US012750935B1

(12) United States Patent
Wei

(10) Patent No.: US 12,750,935 B1
(45) Date of Patent: Sep. 29, 2026

(54) CONTROL CIRCUIT OF FLAME LAMP AND FLAME LAMP

(71) Applicant: Guangzhou Xushen Technology Co., Ltd., Guangzhou (CN)

(72) Inventor: Ninghua Wei, Guangzhou (CN)

(73) Assignee: Guangzhou Xushen Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/402,975

(22) Filed: Nov. 26, 2025

(30) Foreign Application Priority Data

Sep. 12, 2025 (CN) ......................... 202521978549.8
Sep. 12, 2025 (CN) ......................... 202521978568.0

(51) Int. Cl.

*H05B 45/44* (2020.01)
*F21K 9/238* (2016.01)
*F21V 23/04* (2006.01)
*F21Y 115/10* (2016.01)

(52) U.S. Cl.

CPC ............. *H05B 45/44* (2020.01); *F21K 9/238* (2016.08); *F21V 23/0492* (2013.01); *F21Y 2115/10* (2016.08)

(58) Field of Classification Search

CPC ..... H05B 45/44; F21K 9/238; F21V 23/0492; F21Y 2115/10

See application file for complete search history.

(56) References Cited

U.S. PATENT DOCUMENTS

2021/0254803 A1* 8/2021 Xu ........................ F21S 10/043

FOREIGN PATENT DOCUMENTS

CN 204387751 U * 6/2015
JP 3539284 B2 * 7/2004

* cited by examiner

*Primary Examiner* — Henry Luong

(57) ABSTRACT

A control circuit of a flame lamp includes electrical connection lines, light emitting units, and a control module. The number of the electrical connection lines is M, and M is greater than or equal to 3. The number of the light emitting units is N, and N is greater than M. One end of each of two light emitting units in a light emitting group is electrically connected to one electrical connection line, the other end of each of two light emitting units is electrically connected to another electrical connection line, and polarity directions of the two light emitting units are opposite to each other. The control module is electrically connected to each electrical connection line and configured to control electrical level states of two electrical connection lines and enable the at least two light emitting units in the light emitting group to emit light alternately.

13 Claims, 8 Drawing Sheets

CONTROL CIRCUIT OF FLAME LAMP AND FLAME LAMP

CROSS REFERENCE TO RELATED APPLICATIONS

This application claims priority to the Chinese patent application No. 202521978549.8, filed on Sep. 12, 2025, and the Chinese patent application No. 202521978568.0, filed on Sep. 12, 2025, the disclosure of which are incorporated by reference herein in its entirety.

FIELD OF THE DISCLOSURE

The present disclosure relates to the technical field of electronics, and in particular to a flame lamp and a control circuit of the flame lamp.

BACKGROUND

A flame lamp refers to a lamp that simulates a flame effect by turning multiple LED beads on and off in sequence. An LED bead control method of existing flame lamps can only turn a single LED bead on or off, or turn multiple LED beads in a same group on or off simultaneously, resulting in a poor simulated flame effect. Moreover, existing flame lamps can only show flickering in a vertical direction, lack a swinging effect from side to side, have limited flame simulation realism, and offer a single visual presentation.

SUMMARY

The following presents a simplified summary of the disclosure in order to provide a basic understanding of some aspects of the disclosure. This summary is not an extensive overview of the disclosure. It is not intended to identify critical elements or to delineate the scope of the disclosure. Its sole purpose is to present some concepts of the disclosure in a simplified form as a prelude to the more detailed description that is presented elsewhere.

In some embodiments, a control circuit of a flame lamp is provided. The control circuit of a flame lamp includes a plurality of electrical connection lines, a plurality of light emitting units, and a control module. The number of the plurality of electrical connection lines is M, and M is greater than or equal to 3. The number of the plurality of light emitting units is N, and N is greater than M. At least two of the plurality of light emitting units form one light emitting group, one end of each of two of the at least two of the plurality of light emitting units in the light emitting group is electrically connected to one of the plurality of electrical connection lines, the other end of each of two of the at least two of the plurality of light emitting units is electrically connected to another one of the plurality of electrical connection lines, and polarity directions of the two of the at least two of the plurality of light emitting units are opposite to each other. The control module is electrically connected to each of the plurality of electrical connection lines and configured to control electrical level states of two of the plurality of electrical connection lines connected to the light emitting group and enable the at least two of the plurality of light emitting units in the light emitting group to emit light alternately.

In some embodiments, a flame lamp is provided. The flame lamp includes the control circuit of the flame lamp described in the above embodiments.

In some embodiments, a flame lamp is provided. The flame lamp includes a strip-shaped substrate, a plurality of light emitting units, and a control module. The strip-shaped substrate has a length direction and a width direction. The plurality of light emitting units are continuously arranged along the length direction of the strip-shaped substrate and arranged in a staggered manner along the width direction of the strip-shaped substrate. The plurality of light emitting units cooperatively form a light emitting path. The control module is configured to control the plurality of light emitting units to be turned on or turned off.

BRIEF DESCRIPTION OF THE DRAWINGS

Illustrative embodiments of the present disclosure are described in detail below with reference to the attached drawing figures.

NUMERAL REFERENCES IN THE DRAWINGS

S—electrical connection line;
10—light emitting path; 100—light emitting group; 101—LED bead;
40—control module; 41—micro-control unit;
50—strip-shaped substrate;
70—base;
80—lampshade;
90—mounting plate.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure shall fall within the scope of the disclosure.

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

Figure 1:
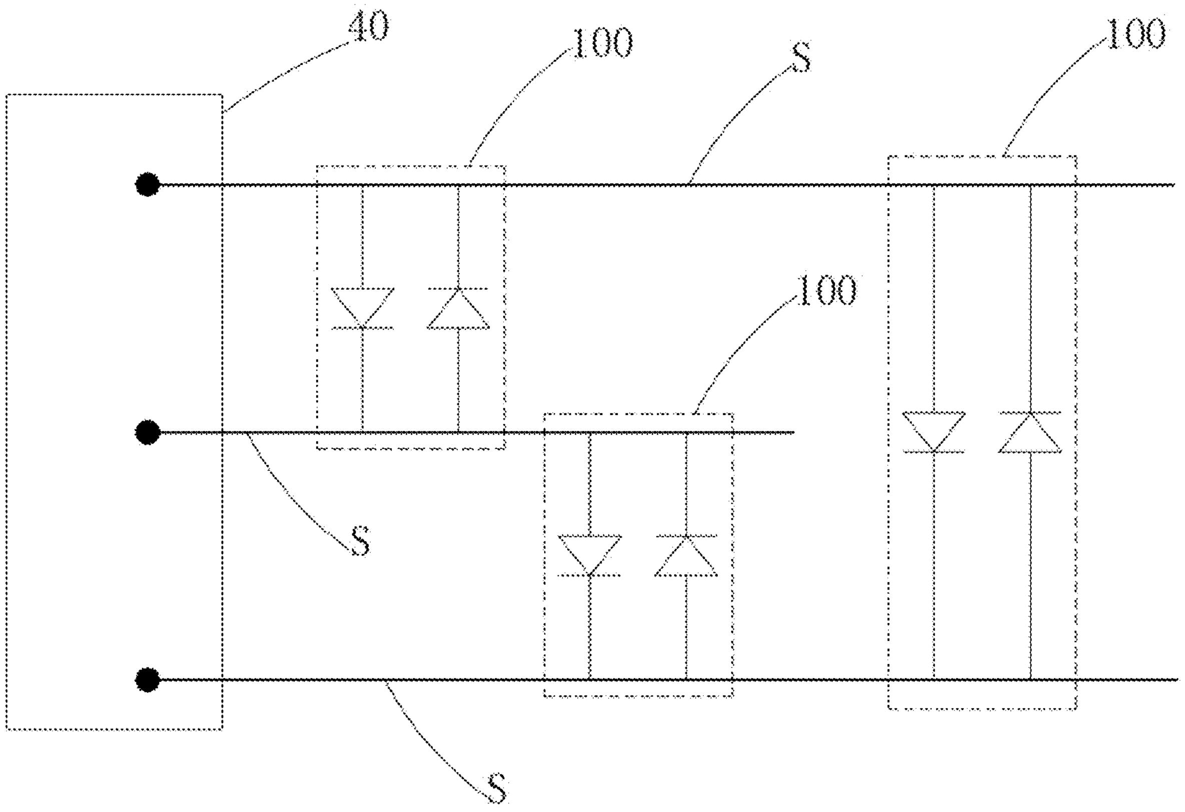
FIG. 1 is a schematic diagram of a control circuit of a flame lamp according to Embodiment I of the present disclosure.
Figure 2:
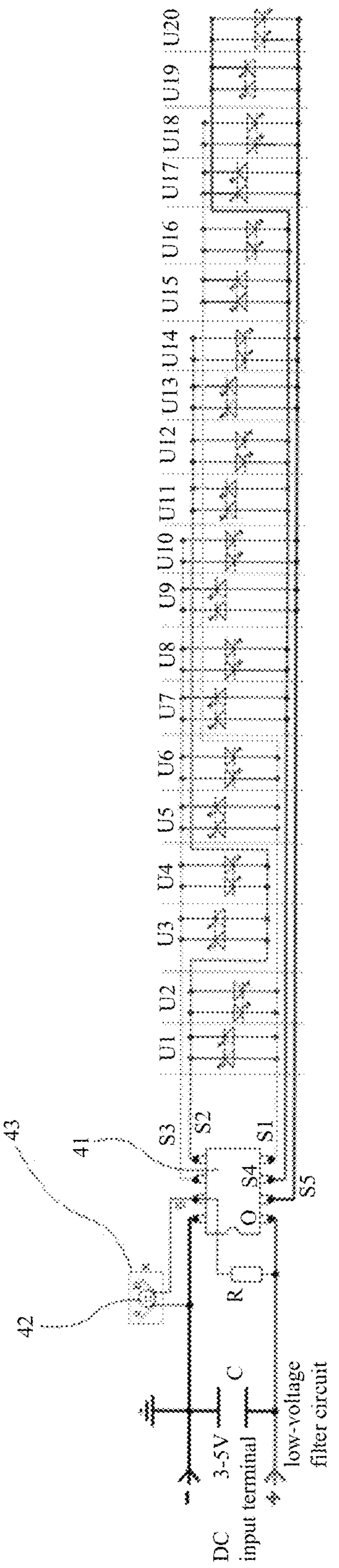
FIG. 2 is a schematic diagram of an overall solution of the control circuit of the flame lamp according to Embodiment I of the present disclosure.

Referring to FIGS. 1-2, Embodiment I of the present disclosure provides a control circuit of a flame lamp. The control circuit of the flame lamp may include a plurality of electrical connection lines S, a plurality of light emitting units, and a control module 40. The number of the plurality of electrical connection lines S may be M, and M may be greater than or equal to 3. The number of the plurality of light emitting units may be N, and N may be greater than M. At least two light emitting units may form one light emitting group 100. One end of each of two of the at least two light emitting units may be electrically connected to a same electrical connection line S, the other end of each of the two of the at least two light emitting units may be electrically connected to another electrical connection line S, and polarity directions of the two of the at least two light emitting units may be opposite to each other. The control module 40 may be electrically connected to each of the M electrical connection lines S, and the control module 40 may control a level state of each of two electrical connection lines S connected to the same light emitting group 100 to cause different light emitting units in the same light emitting group 100 to emit light alternately.

Specifically, the plurality of electrical connection lines S may be arranged on a circuit board, and the plurality of light emitting units may be arranged in sequence on the circuit board. The circuit board may be arranged as a straight strip to enable the flame lamp to present a flame effect of flickering up and down. The circuit board may also be designed as an S-shaped, Y-shaped or Z-shaped structure, allowing the flame lamp to exhibit a swaying flame effect. The plurality of light emitting units may be arranged on circuit boards of different shapes to achieve different flame appearances and lighting effects. The light emitting unit may include at least one light emitting diode. In this embodiment, the light emitting unit may include two light emitting diodes. In other embodiments, the light emitting unit may include one or three or more light emitting diodes. One end of the light emitting unit may be an anode of the light emitting diode, and the other end of the light emitting unit may be a cathode of the light emitting diode. As shown in FIG. 2, in a same light emitting group 100, the anode of a light emitting unit U1 may be connected to one electrical connection line S1, and the cathode of the light emitting unit U1 may be connected to an electrical connection line S2. The cathode of a light emitting unit U2 may be connected to the electrical connection line S1, and the anode of the light emitting unit U2 may be connected to the electrical connection line S2.

Alternate illumination of two light emitting units in the same light emitting group 100 may be based on a level state relationship of two electrical connection lines S which are connected to the two light emitting units. When the two electrical connection lines S are in different level states, one light emitting unit in the light emitting group 100 may be on, and the other light emitting unit may be off. As shown in FIG. 2, for the light emitting unit U1 and light emitting unit U2 each of which may be connected to an electrical connection line S1 and an electrical connection line S2, the anode of the light emitting unit U1 may be connected to the electrical connection line S1, and the cathode of the light emitting unit U1 may be connected to the electrical connection line S2. The anode of the light emitting unit U2 may be connected to the electrical connection line S2, and the cathode of the light emitting unit U2 may be connected to the electrical connection line S1. When the electrical connection line S1 is at a high level and the electrical connection line S2 is at a low level, the light emitting unit U1 may light up, and the light emitting unit U2, due to an opposite diode direction, may be in a cut-off state, not conducting, i.e., the light emitting unit U2 may be off. Similarly, when the electrical connection line S1 is at a low level and the electrical connection line S2 is at a high level, the light emitting unit U2 may light up, and the light emitting unit U1 may be off. By changing the level relationship of the electrical connection line S1 and the electrical connection line S2 (i.e., causing the level of the electrical connection line S1 and the level of the electrical connection line S2 to be inverted), the light emitting unit U1 and the light emitting unit U2 may be made to emit light alternately. Furthermore, when the control module 40 controls any light emitting group 100 (composed of the light emitting unit U1 and the light emitting unit U2) to be turned on, the control module 40 may only apply level states to the two electrical connection lines S connected to this light emitting group 100, while the remaining electrical connection lines S may maintain a non-conducting state, thereby avoiding circuit interference between different light emitting groups 100. Specifically, the remaining electrical connection lines S may be set to a high resistance or disconnected, so that the light emitting units connected to the remaining electrical connection lines S may be in a non-powered state and may not emit light. In this way, it can be seen that the control module 40, by changing the level relationship of the two electrical connection lines S connected to the same light emitting group 100, may achieve alternate illumination of the two light emitting units in the same light emitting group 100, enabling fine-grained control of the light spots in the same light emitting group 100. In other embodiments, four or more light emitting units may form one light emitting group 100, in this case, each two light emitting units may be turned on or turned off simultaneously.

In the manner of alternate illumination of two light emitting units in the same light emitting group 100, when specifically applied to a circuit board, the plurality of light emitting units may be sequentially arranged from one end of the circuit board to the other end of the circuit board, and two adjacent light emitting units may form one light emitting group 100, with the plurality of light emitting groups 100 arranged on the circuit board from one end of the circuit board to the other end of the circuit board. The control module 40 may control the light emitting groups 100 located on the circuit board according to a timing sequence, so that the two light emitting units in the light emitting group 100 at one end of the circuit board may emit light sequentially, followed by the two light emitting units in a next light emitting group 100 to emit light, and similarly for subsequent light emitting groups 100, thereby enabling the entire circuit board to emit light sequentially from one end of the circuit board to the other end of the circuit board. As a result, a dynamic flame effect simulated by the flame lamp may change from coarse jumps to a fine point-by-point progression. Moreover, since in the control circuit, the number of the electrical connection lines S may be less than the number of light emitting units, in a single circuit board, and in a case where the number of electrical connection lines S is fixed, the control circuit of this embodiment may allow more light emitting units to be arranged on the circuit board and to emit light one by one, thereby producing a simulated flame effect that may be finer and more realistic. In summary, through this control circuit of the flame lamp, two light emitting units with opposite polarity directions in the same light emitting group 100 may alternately emit light, and by arranging electrical connection lines S fewer than the number of light emitting units to control the plurality of light emitting units, the plurality of light emitting units may be turned on and off one by one, making the simulated flame effect finer and more realistic.

In other embodiments, according to different requirements, one or more light emitting groups 100 may be turned on or turned off for a long time, while other light emitting groups 100 may be turned on or off in a specified order to simulate a different flame effect.

In some embodiments, a quantitative relationship between M electrical connection lines S and N light emitting units may satisfy the following equation:

$$N=M\times(M-1)$$

Specifically, N may be a total number of the light emitting units, and M may be the number of the electrical connection lines S. Since each electrical connection line S may cooperate with any one of the remaining (M−1) electrical connection lines S to be connected to a same light emitting group 100, and each light emitting group 100 may include two light emitting units, a total number of light emitting units N may equal a product of M and (M−1). The above quantitative relationship may ensure that independent or alternate illumination of a larger number of light emitting units may be achieved even when the number of electrical connection lines S is limited, thereby producing a finer and more realistic flame effect under same hardware conditions. As shown in FIG. 2, when the number of the electrical connection lines S is 5, the number of light emitting units that the control module 40 may control may be 20.

In some embodiments, the control module 40, by controlling the level states of different electrical connection lines S, may enable the plurality of light emitting groups 100 to emit light sequentially from a first group to a P-th group, or from the P-th group to the first group. The P-th group may be a last group of the plurality of light emitting groups 100 arranged in a predetermined order. The control module 40, may control the plurality of light emitting groups 100 to emit light in an arrangement order, thereby producing a dynamic effect flame-flickering effect. In addition, an opposite illumination sequence may enable the flame lamp applying the control circuit to have a plurality of display forms, thereby expanding application scenarios of the flame lamp.

Referring to FIG. 2, in some embodiments, the control module 40 may include a micro-control unit 41. A plurality of Input/Output pins (i.e., IO pins of the micro-control unit 41 may be electrically connected to the plurality of electrical connection lines S respectively, for controlling the level states of the electrical connection lines S. For example, the micro-control unit 41 may have 8 IO pins, 2 IO pins may be connected to an external power supply, 1 IO pin may be connected to a switch K, and each of the remaining 5 IO pins may be connected to a respective one of 5 electrical connection lines S. In this case, the number of the light emitting units connected to the 5 electrical connection lines S is 20. Thus, by arranging only 5 IO pins, a control of lighting the 20 light emitting units may be achieved. Compared to a traditional method where one IO pin only controls one light emitting unit, the control circuit described above may achieve lighting control of light emitting units far exceeding the number of electrical connection lines S, thereby greatly reducing an occupation of the IO pins of the micro-control unit 41. As shown in FIG. 2, the 5 electrical connection lines S specifically include an electrical connection line S1, an electrical connection line S2, an electrical connection line S3, an electrical connection line S4, and an electrical connection line S5. In this case, 20 light emitting units are provided, corresponding to 10 light emitting groups 100. The 20 light emitting units specifically include a light emitting unit U1, a light emitting unit U2, a light emitting unit U3, a light emitting unit U4 . . . a light emitting unit U17, a light emitting unit U18, a light emitting unit U19, and a light emitting unit U20. The 20 light emitting units are arranged in an order shown in FIG. 2 as from the light emitting unit U1 to the light emitting unit U20, and a polarity direction of each light emitting unit (light emitting diode) is as shown in FIG. 2. The control module 40, by sequentially applying level changes to the line pairs (S1,S2), (S2,S3), (S1,S3), (S4,S3), (S5,S3), (S4,S2), (S5,S2), (S4,S1), (S5,S1), (S5,S4) and switching the polarity relationship in each short time window, may achieve a sequential illumination order of U1→U2→U3→U4→U5→U6 . . . U15→U16→U17→U18→U19→U20, forming a dynamic effect similar to flame flickering.

Since the flame lamp may be used in environments placed or mounted facing upwards or facing downwards, in order to ensure that the simulated flame may appear to dynamically move upwards regardless of whether the flame lamp is placed facing upwards or downwards, a switch may also be provided. The switch may control a illumination sequence of the plurality of light emitting units, enabling the plurality of light emitting units to emit light in the order from U1 to U20 or in the order from U20 to U1. Referring to FIG. 2, the control module 40 may include a switch K. The illumination sequence of the plurality of light emitting groups 100 may be changed through the switch K. Specifically, the switch K may be arranged on one IO pin of the micro-control unit 41. The user may manually control the switch K to change the illumination sequence of the plurality of light emitting units, so that when the flame lamp is mounted facing upwards or facing downwards, the simulated flame may dynamically appear to move upwards.

In some embodiments, the control module 40 may further include a gravity sensor 42 for detecting a placement direction of the flame lamp and changing the illumination sequence of the plurality of light emitting groups 100 according to a detection result. According to the gravity sensor detecting the placement direction of the flame lamp, the illumination sequence of the plurality of light emitting groups 100 (i.e., the plurality of light emitting units) may be automatically changed. To further reduce an occupation of the IO pins of the micro-control unit 41, the control module 40 may include the switch 43 and the gravity sensor 42. The gravity sensor 42 may be linked with the switch 43. The gravity sensor 43 may be used to change a connected circuit of the switch when the flame lamp is placed upwards or downwards, thereby changing the illumination sequence of the plurality of light emitting groups 100. As shown in FIG. 2, the gravity sensor 42 may be arranged in the switch 43. When the flame lamp is placed upright, the gravity sensor 42 may be connected to terminal a in the switch 43, causing the plurality of light emitting units to emit light in the order from U1 to U20. When the flame lamp is placed inverted, the gravity sensor C may be connected to terminal b in the switch K, causing the plurality of light emitting units to emit light in the order from U20 to U1. The linked arrangement of the gravity sensor 42 and the switch 43 may allow the flame lamp to automatically change the illumination sequence of the plurality of light emitting units whether the flame lamp is placed facing upwards or facing downwards, causing the flame simulated by the plurality of light emitting units to appear to move upwards. Moreover, the gravity sensor 42 and the switch 43 may share one IO pin, reducing the occupation of the IO pins of the micro-control unit 41, allowing the micro-control unit 41 to have more free IO pins for connecting electrical connection lines S, thereby expanding the number of controllable light emitting units.

Embodiment II of the present disclosure provides a flame lamp.

Figure 3:
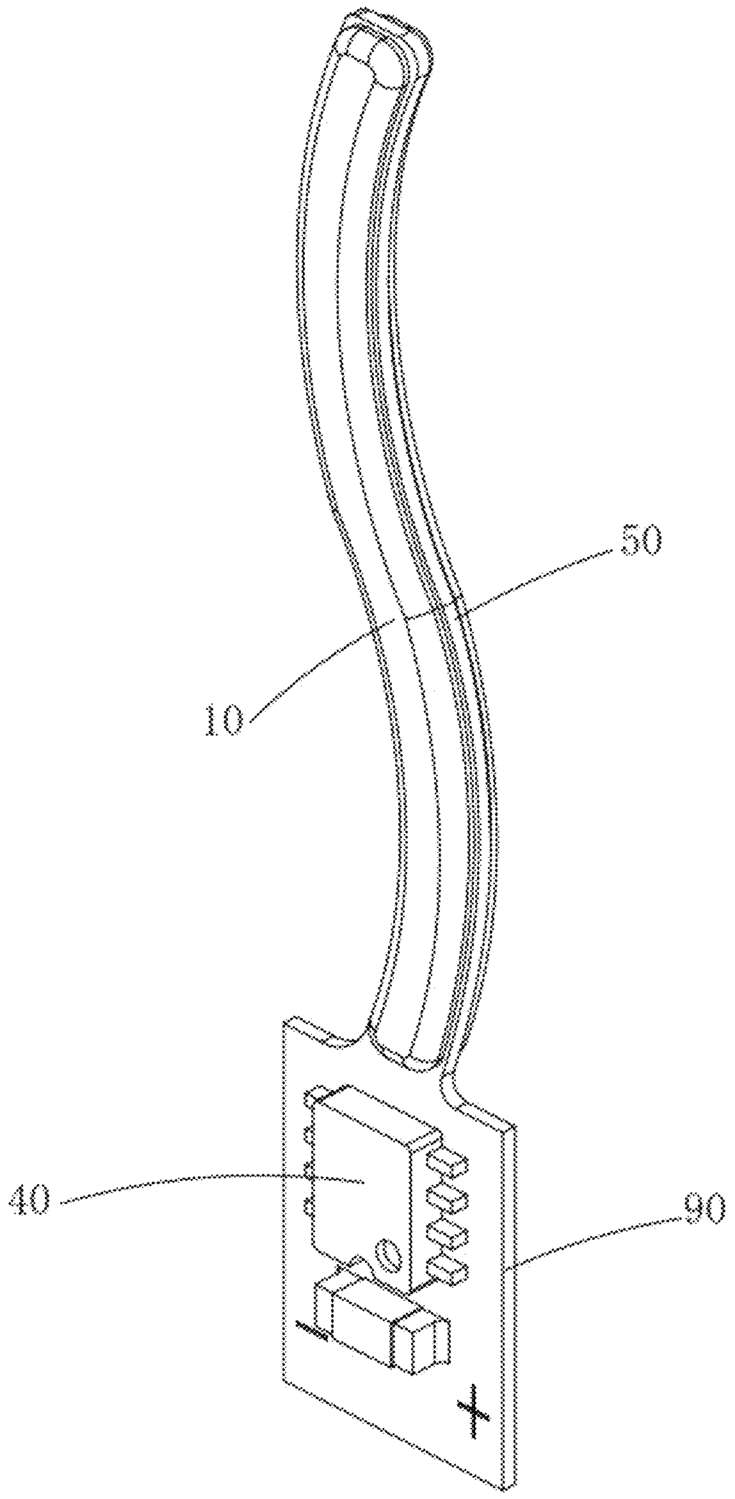
FIG. 3 is a structural view of a strip-shaped substrate and a light emitting path according to Embodiment II of the present disclosure.
Figure 4:
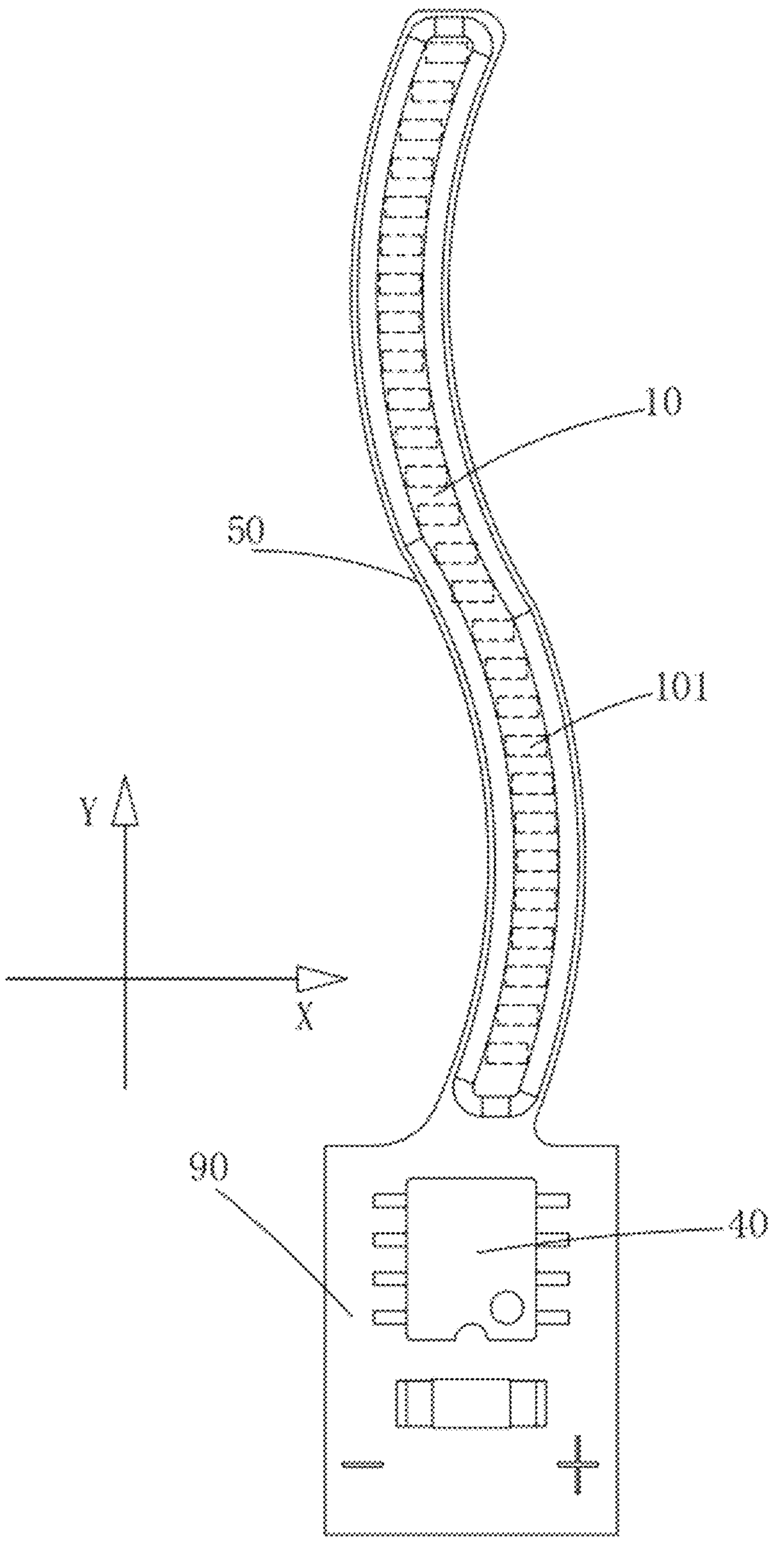
FIG. 4 is a front projection schematic view of the strip-shaped substrate and the light emitting path according to Embodiment II, with the strip-shaped substrate in an S-shape.
Figure 5:
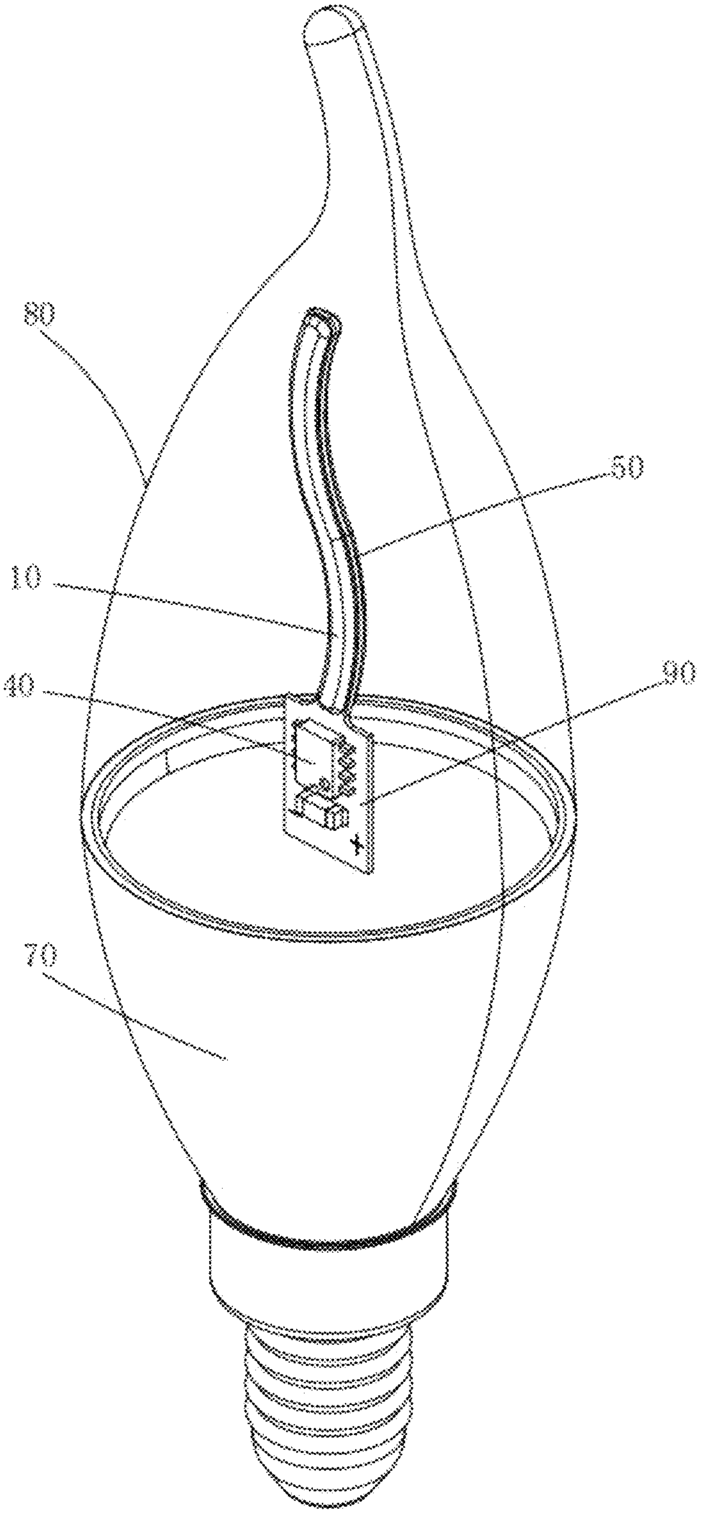
FIG. 5 is a schematic view of an overall structure of the flame lamp according to Embodiment II of the present disclosure.

Referring to FIGS. 3-5, the flame lamp may include the control circuit of the flame lamp described in Embodiment I. The flame lamp may further include a strip-shaped substrate 50. The strip-shaped substrate 50 may have a length direction and a width direction. The plurality of light emitting units may be continuously arranged along the length direction of the strip-shaped substrate 50 and may be staggered relative to each other in the width direction of the strip-shaped substrate 50, forming a light emitting path 10. The control module 40 may control to turn on or off of the plurality of light emitting units.

Specifically, the strip-shaped substrate 50 may be arranged as an elongated structure with a defined length direction and width direction. The length direction may be a Y-axis direction shown in FIG. 4, and the width direction may be an X-axis direction shown in FIG. 4. The light emitting unit may include at least one LED bead 101. Taking a light emitting unit including one LED bead 101 as an example, as shown in FIG. 4, the plurality of light emitting units (LED beads 101) may be continuously arranged along the length direction of the strip-shaped substrate 50 and may be arranged in a staggered manner in the width direction. That is, an arrangement path of the plurality of light emitting units (LED beads 101) on the strip-shaped substrate 50 may form the light emitting path 10, and the light emitting path 10 may be continuous in the length direction of the strip-shaped substrate 50 and staggered in the width direction, thereby forming a serpentine light emitting path 10. The control module 40, based on the control circuit as in Embodiment I, may be electrically connected to the plurality of light emitting units and may control the light emitting units to emit light sequentially according to a preset timing sequence, thereby simulating the dynamic flame effect. Different from a straight arrangement of light emitting units in the prior art, this embodiment introduces a staggered arrangement in the width direction, causing the light emitting path 10 of the flame lamp to no longer be limited to a single longitudinal straight line, but to form a left-right swaying trajectory. Under a timing control of the control module 40, the illumination sequence may not only simulate a traditional up-and-down flickering of the flame, but also superimpose a left-right swaying visual effect, thereby making the flame simulation finer and more realistic.

In other embodiments, the control module 40 may control a single or a plurality of light emitting units to emit light for a long time or to be turned off, while the remaining light emitting units may be turned on according to a set sequence to achieve a rhythmic lighting effect, so that the flame lamp may simulate flames of various appearances.

In some embodiments, the strip-shaped substrate 50 may be rigid and may be arranged in a serpentine form along the length direction of the strip-shaped substrate 50, so that the arrangement path of the plurality of light emitting units may present a serpentine form. Specifically, the strip-shaped substrate 50 may be a rigid circuit board cut into a serpentine shape along the length direction of the strip-shaped substrate 50, so that the arrangement path of the plurality of light emitting units arranged on the strip-shaped substrate 50 may present a serpentine form, i.e., the serpentine form of the strip-shaped substrate 50 may directly define the serpentine form of the light emitting path 10. By directly arranging the serpentine-shaped substrate, both stability of the light emitting path 10 and rapid realization of an overall layout during mass production may be ensured. In other embodiments, the strip-shaped substrate 50 may be a flexible circuit board, which may be cut into a specified shape to form light emitting paths 10 of different serpentine configurations.

Referring to FIG. 4, in some embodiments, the serpentine form of the strip-shaped substrate 50 may be S-shaped, so that the arrangement path of the plurality of light emitting units may be S-shaped, i.e., the light emitting path 10 may be S-shaped. Specifically, the serpentine form of the strip-shaped substrate 50 may be an S-shape, causing the plurality of light emitting units to be gradually staggered relative to each other along the length direction of the strip-shaped substrate 50. As shown in FIG. 4, the LED beads 101 distributed in an upper half of the strip-shaped substrate 50 which may be S-shaped may be overall biased to one side, and the LED beads 101 in a lower half of the strip-shaped substrate 50 may be overall biased to the other side, forming an S-shaped light emitting path 10. The light emitting path 10 may roughly cover the S-shaped strip-shaped substrate 50, allowing light of the light emitting path 10 to cover the strip-shaped substrate 50. When the flame lamp emits light, the dynamic flame effect may show both up-and-down fluctuations and accompanying left-right swaying. The S-shape may be a smooth transition curve, making the simulated flame effect more stable.

In other embodiments, even if the strip-shaped substrate 50 is arranged in as straight strip structure, the plurality of LED beads 101 may still form a serpentine arrangement path on the strip-shaped substrate 50 through the staggered arrangement. For example, by distributing the LED beads 101 sequentially at left and right positions on the straight board, the overall light emitting path 10 may present an S-shape, Z-shape or Y-shape.

Referring to FIG. 5, the flame lamp may further include a base 70, a lampshade 80, and a mounting plate 90. The mounting plate 90 may be integrally formed with the strip-shaped substrate 50 as a one-piece structure. The control module 40 may be arranged on the mounting plate 90, and the mounting plate 90 may be fixed to the base 70. The lampshade 80 may cover the base 70 and surround the strip-shaped substrate 50, allowing light from the plurality of light emitting units on the strip-shaped substrate 50 to pass through the lampshade 80.

In summary, in the flame lamp of this embodiment, the plurality of light emitting units may be arranged in a staggered manner in the width direction on the strip-shaped substrate 50, in combination with a point-by-point lighting timing sequence of the control module 40, causing the light emitting path 10 to present serpentine forms such as S-shape, Z-shape, or Y-shape. On the basis of the traditional up-and-down flickering flame effect, a left-right swaying dynamic effect may be added, significantly improving the realism and visual appeal of the flame simulation, meeting market demands for flame lamps with higher simulation.

Embodiment III of the present disclosure also provides a flame lamp.

The structure of the flame lamp of Embodiment III may be largely the same as the flame lamp of Embodiment II, with a difference lying in the serpentine form of the strip-shaped substrate 50.

Figure 6:
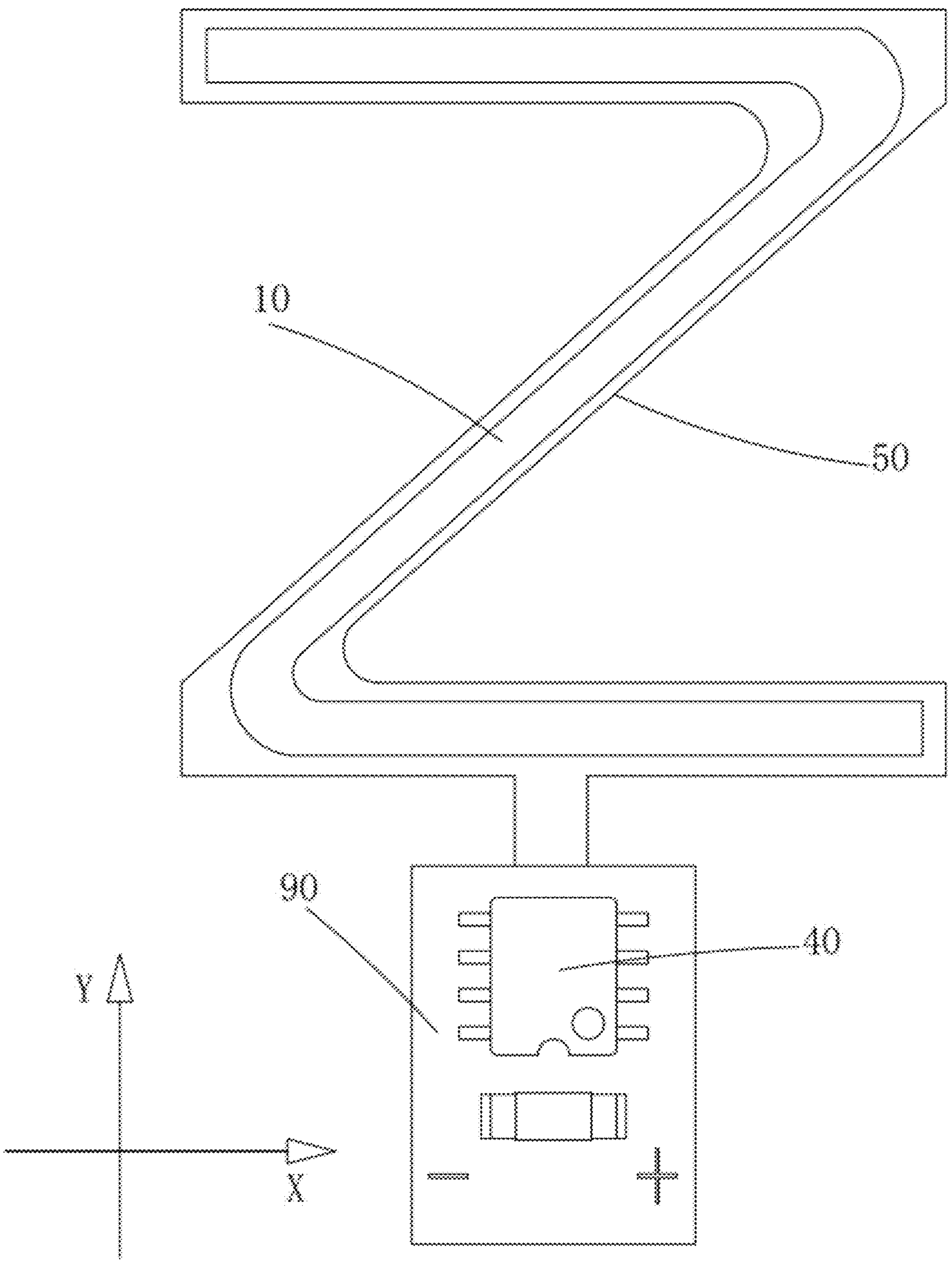
FIG. 6 is a front projection schematic view of the strip-shaped substrate and the light emitting path according to Embodiment III, with the strip-shaped substrate in a Z-shape.

Referring to FIG. 6, the serpentine form of the strip-shaped substrate 50 may be Z-shaped, so that the arrangement path of the plurality of light emitting units may be Z-shaped. The Z-shaped strip-shaped substrate 50 may cause the light emitting path 10 to overall exhibit a Z-shaped arrangement. As the control module 40 controls the plurality of light emitting units to emit light from one end of the strip-shaped substrate 50 to the other end of the strip-shaped substrate 50, the light emitting path 10 may flicker up and down while simultaneously swaying left and right, creating a more lively simulated flame effect. It should also be noted that the Z-shaped strip-shaped substrate 50 may also be mounted on the base 70 in an inclined form, causing the strip-shaped substrate 50 to appear as a lightning shape visually.

Embodiment IV of the present disclosure also provides a flame lamp.

The structure of the flame lamp of Embodiment IV may be largely the same as the flame lamp of Embodiment II, with the difference lying in the serpentine form of the strip-shaped substrate 50.

Figure 7:
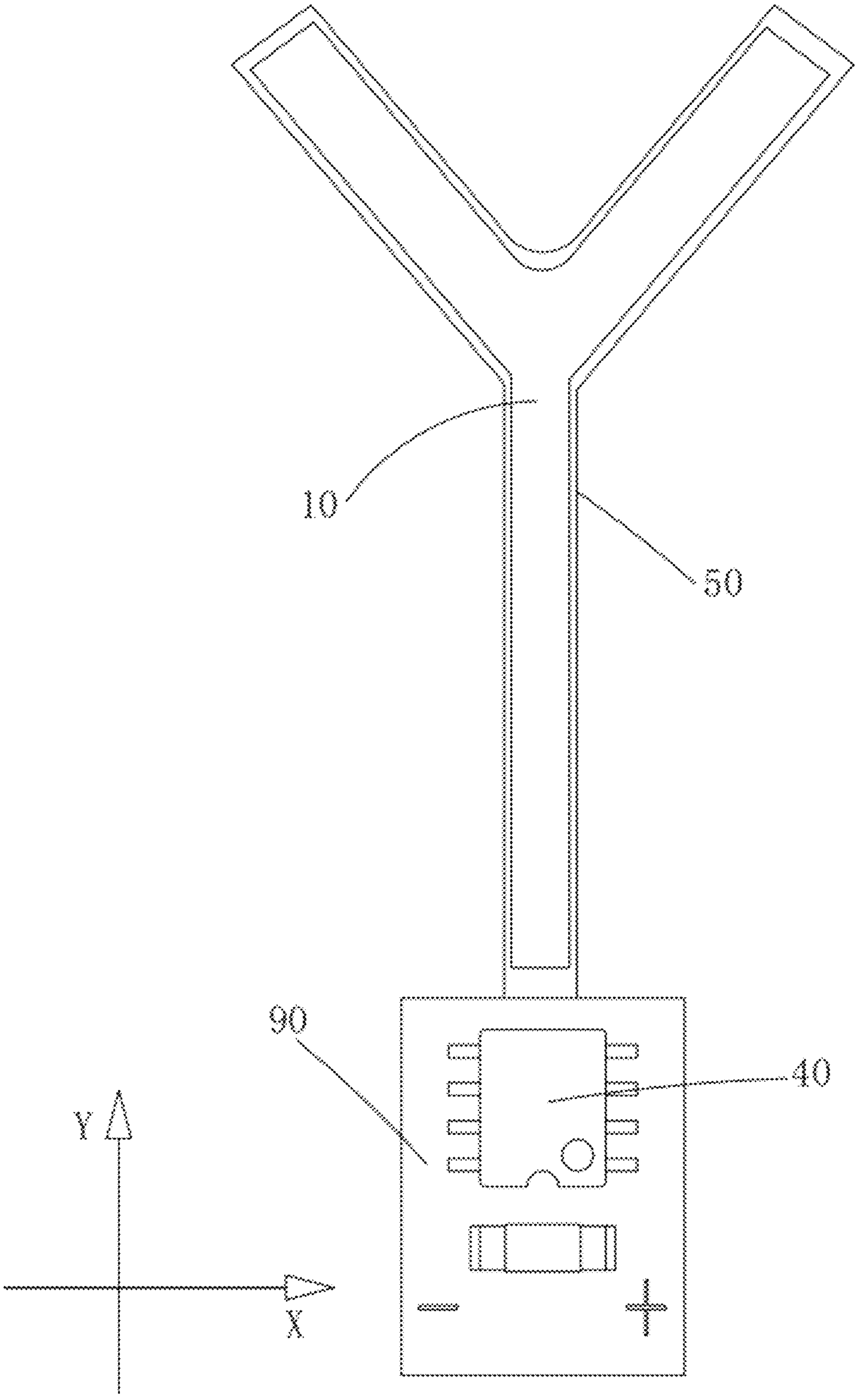
FIG. 7 is a front projection schematic view of the strip-shaped substrate and the light emitting path according to Embodiment IV, with the strip-shaped substrate in a Y-shape.

Referring to FIG. 7, the serpentine form of the strip-shaped substrate 50 may be Y-shaped, so that the arrangement path of the plurality of light emitting units may be Y-shaped. In this case, the light emitting units may be relatively concentrated in a lower part of the strip-shaped substrate 50, while the light emitting units in an upper part of the strip-shaped substrate 50 may disperse to left and right sides of the strip-shaped substrate 50, forming a forked light emitting path 10. When the control module 40 illuminates the light emitting units according to a bottom-to-top timing sequence, a distinctive forked flame effect may be produced, with the flame converging from the bottom and then dispersing and flickering to the left and right.

Embodiment V of the present disclosure also provides a flame lamp.

The structure of the flame lamp of Embodiment V may be largely the same as the flame lamp of Embodiment II, with the difference lying in the serpentine form of the strip-shaped substrate 50.

Figure 8:
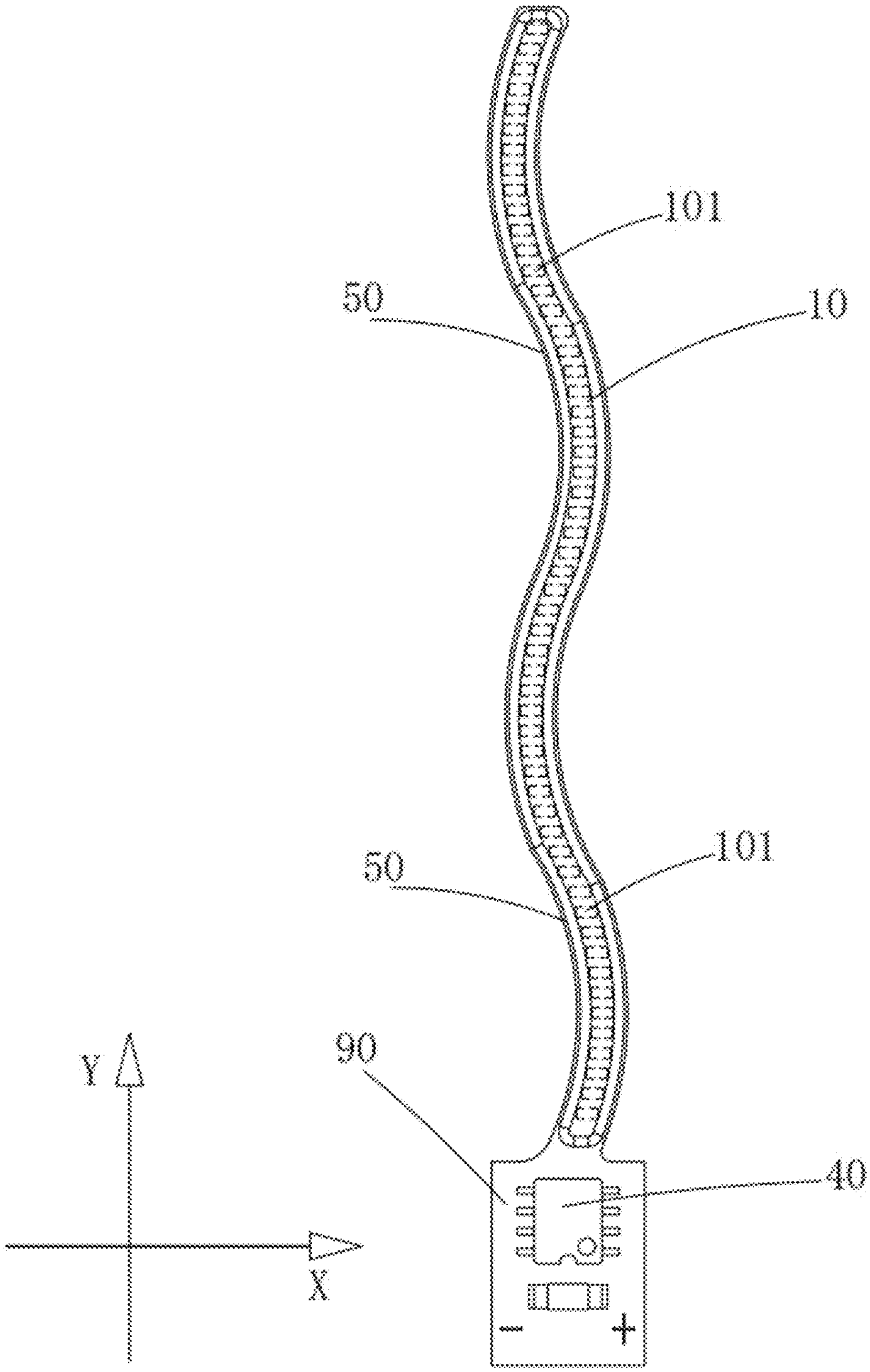
FIG. 8 is a front projection schematic view of a plurality of strip-shaped substrates and the light emitting path according to Embodiment V.

Referring to FIG. 8, a plurality of strip-shaped substrates 50 may be provided. The plurality of strip-shaped substrates 50 may be connected end to end along length directions of the plurality of strip-shaped substrates 50. As shown in FIG. 8, when the strip-shaped substrate 50 is arranged in an S-shaped serpentine form, the plurality of strip-shaped substrates 50 may be connected end to end along the length direction of the plurality of strip-shaped substrates 50 to form a curved substrate, thereby forming a curved light emitting path 10. The plurality of strip-shaped substrates 50 may also be manufactured as a one-piece structure through an integrated molding process. For example, a longer circuit board may be cut to form a continuous structure that may interconnect a plurality of S-shaped segments. In other embodiments, a plurality of Y-shaped substrates 50 connected end to end or Z-shaped strip-shaped substrates 50 connected end to end may also be employed.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A control circuit of a flame lamp, comprising:

a plurality of electrical connection lines, wherein the number of the plurality of electrical connection lines is M, and M is greater than or equal to 3;

a plurality of light emitting units, wherein the number of the plurality of light emitting units is N, and N is greater than M; at least two of the plurality of light emitting units form one light emitting group, one end of each of two of the at least two of the plurality of light emitting units in the light emitting group is electrically connected to one of the plurality of electrical connection lines, the other end of each of two of the at least two of the plurality of light emitting units is electrically connected to another one of the plurality of electrical connection lines, and polarity directions of the two of the at least two of the plurality of light emitting units are opposite to each other; and a control module, electrically connected to each of the plurality of electrical connection lines and configured to control electrical level states of two of the plurality of electrical connection lines connected to the light emitting group and enable the at least two of the plurality of light emitting units in the light emitting group to emit light alternately;

wherein when the control module controls the light emitting group to emit light, the control module applies electrical level states only to the two of the plurality of electrical connection lines which are connected to the light emitting group, and remaining electrical connection lines of the plurality of electrical connection lines remain in a non-conductive state;

wherein the plurality of light emitting units form a plurality of light emitting groups, the control module is configured to control electrical level states of the plurality of electrical connection lines to enable the plurality of the light emitting groups to emit light sequentially from a first group of the plurality of light emitting groups to a P-th group of the plurality of light emitting groups, or from the P-th group to the first group; and wherein the control module comprises a gravity sensor, and the gravity sensor is configured to detect a placement orientation of the flame lamp to obtain a detection result and change an illumination sequence of the plurality of light emitting groups according to the detection result.

2. The control circuit of the flame lamp according to claim 1, wherein the plurality of electrical connection lines and the plurality of light emitting units satisfy the following equation: N=M×(M−1).

3. The control circuit of the flame lamp according to claim 1, wherein each of the plurality of light emitting units comprises at least one light emitting diode.

4. The control circuit of the flame lamp according to claim 1, wherein the at least two of the plurality of light emitting units in the light emitting group are configured to emit light alternately based on an electrical level relationship of the two of the plurality of electrical connection lines;

when the two of the plurality of electrical connection lines are at different electrical level states, one of the at least two of the plurality of light emitting units in the light emitting group is turned on, and the other of the two of the plurality of light emitting units is turned off.

5. The control circuit of the flame lamp according to claim 1, wherein the control module comprises a switch, and the switch is configured to change an illumination sequence of the plurality of light emitting groups.

6. The control circuit of the flame lamp according to claim 1, wherein the control module comprises a switch, the gravity sensor is interactively arranged with the switch, the gravity sensor is configured to change a connected circuit of the switch when the flame lamp is placed facing upwards or downwards and change the illumination sequence of the plurality of light emitting groups.

7. The control circuit of the flame lamp according to claim 1, wherein the control module comprises a micro-control unit, and the micro-control unit comprises a plurality of IO pins; the plurality of IO pins of the micro-control unit are electrically connected to the plurality of electrical connection lines and configured to control electrical level states of the plurality of electrical connection lines.

8. A flame lamp, comprising the control circuit of the flame lamp according to claim 1.

9. A flame lamp, comprising:

a strip-shaped substrate, wherein the strip-shaped substrate is S-shaped and has a length direction and a width direction;

a plurality of light emitting units, continuously arranged along the length direction of the strip-shaped substrate and arranged in a staggered manner along the width direction of the strip-shaped substrate, wherein the plurality of light emitting units cooperatively form an S-shaped light emitting path; wherein each of the plurality of light emitting units comprises an LED bead;

a control module, configured to control the plurality of light emitting units to be turned on or turned off;

a base;

a mounting plate, fixed to the base and connected to the strip-shaped substrate, wherein the control module is arranged on the mounting plate; and a lampshade, arranged to cover the base and surround the strip-shaped substrate and allowing light emitted from the plurality of light emitting units on the strip-shaped substrate to pass through;

wherein the mounting plate and the strip-shaped substrate are integrally formed with each other as a one-piece structure.

10. The flame lamp according to claim 9, further comprising:

a plurality of electrical connection lines, arranged on the strip-shaped substrate;

wherein at least two of the plurality of light emitting units cooperatively form one light emitting group, one end of each of two of the at least two of the plurality of light emitting units in the light emitting group is electrically connected to one of the plurality of electrical connection lines, the other end of each of the two of the at least two of the plurality of light emitting units is electrically connected to another of the plurality of electrical connection lines, and polarity directions of the two of the at least two of the plurality of light emitting units are opposite to each other;

the control module is electrically connected to each of the plurality of electrical connection lines, and the plurality of light emitting units form a plurality of light emitting groups; the control module is configured to control electrical level states of the plurality of electrical connection lines and enables the plurality of light emitting groups to be turned on or turned off.

11. The flame lamp according to claim 10, wherein the number of the plurality of electrical connection lines is M, the number of the plurality of light emitting units is N, and the plurality of electrical connection lines and the plurality of light emitting units satisfy the following equation: N=M×(M−1).

12. The flame lamp according to claim 10, wherein when the control module controls the light emitting group to emit light, the control module applies electrical level states only to two of the plurality of electrical connection lines which are connected to that light emitting group, remaining electrical connection lines of the plurality of electrical connection lines remain in a non-conductive state, and the plurality of light emitting groups are configured to emit light sequentially from a first group of the plurality of light emitting groups to a P-th group of the plurality of light emitting groups, or from the P-th group to the first group.

13. The flame lamp according to claim 12, wherein the control module comprises a switch and a gravity sensor, the gravity sensor is interactively arranged with the switch, the gravity sensor is configured to change a connected circuit of the switch when the flame lamp is placed facing upwards or downwards, and change an illumination sequence of the plurality of light emitting groups.

* * * * *